W. T. HARRIS.
WHEEL.
APPLICATION FILED JUNE 24, 1907.
1,093,849.
Patented Apr. 21, 1914.
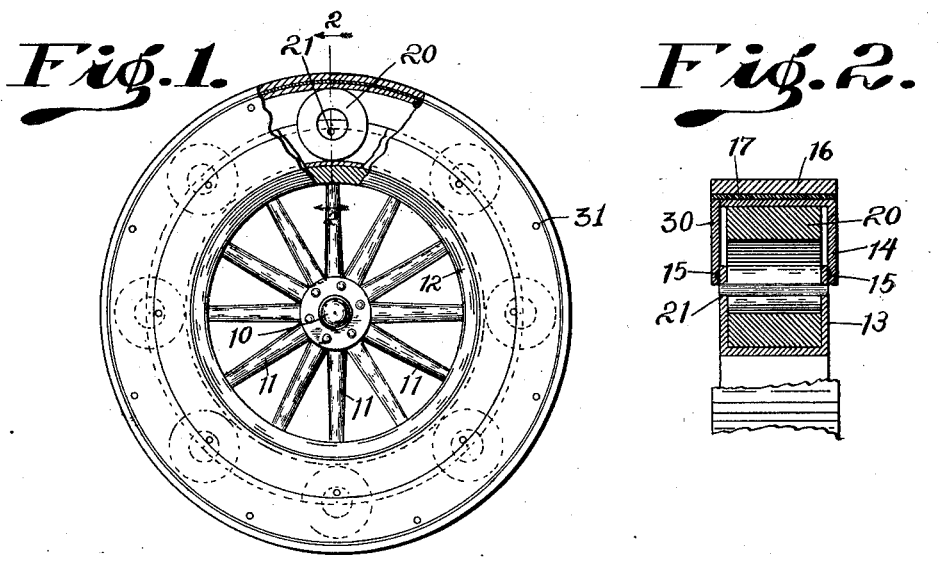
Witnesses
Karl Clendening
Thomas W. McMeans
Inventor
William T. Harris,
By Bradford Hood
Attorneys

UNITED STATES PATENT OFFICE.

WILLIAM T. HARRIS, OF LOUISVILLE, KENTUCKY.

WHEEL.

1,093,849.  Specification of Letters Patent.  Patented Apr. 21, 1914.

Application filed June 24, 1907. Serial No. 380,488.

*To all whom it may concern:*

Be it known that I, WILLIAM T. HARRIS, a citizen of the United States, residing at Louisville, in the county of Jefferson and State of Kentucky, have invented certain new and useful Improvements in Wheels, of which the following is a specification.

The object of my invention is to produce a non-puncturable wheel having vertically yielding qualities.

The accompanying drawings illustrate my invention.

Figure 1 is a side elevation, in partial vertical section, of a wheel embodying my invention; Fig. 2, a section on line 2—2 of Fig. 1.

In the drawings, 10 indicates a hub of any desired form with radiating spokes 11 and felly 12 which carries an externally channeled rim 13. Arranged over the channeled rim 13 is an internally channeled rim 14, the flanges of which fit closely against the flanges of the channeled rim 13 and are provided at their inner peripheries with packing members 15 which bear against the faces of the flanges of the channeled rim 13 so as to prevent the entrance of any dirt into the chamber formed by the two channeled rims 13 and 14. One flange 30 of channeled rim 14 is removably secured by bolts 31 as shown to facilitate assembly. Encircling the channeled rim 14 is a tire 16 between which and the channeled rim 14 is a layer 17 of abestos or other suitable sound-deadening material. The tire 16 may be of any desirable material, but may conveniently be of steel or iron shrunk on to the channeled rim 14 over the sound-deadening layer 17. Between the inner and outer channeled rims are located a plurality of rings 20 formed conveniently of heavy and stiff rubber, which rings are held in place, by pins 21 which are carried by the flanges of the channeled rim 13, said pins or retainers lying at a distance from the bottom of the inner rim exceeding the thickness of its annulus, thereby permitting free rotative movement of the annulus but preventing too great circumferential displacement.

I claim as my invention:

A wheel comprising a body carrying an inner rim, having outwardly extending flanges, an outer rim having inwardly extending flanges which telescope with the flanges of the inner rim, a plurality of independent rubber annuli arranged within and between the flanges of the two rims with their axes substantially parallel with the axis of the wheel, and comparatively small retainers carried by the inner rim and extending into the center openings of the annuli, each of said retainers lying at a distance from the bottom of the inner rim exceeding the thickness of its annulus, thereby permitting free rotative movement of the annulus but preventing too great circumferential displacement.

In witness whereof, I, have hereunto set my hand and seal at Indianapolis, Indiana, this twenty-first day of June, A. D. one thousand nine hundred and seven.

WILLIAM T. HARRIS. [L. S.]

Witnesses:
ARTHUR M. HOOD,
THOMAS W. McMEANS.